March 14, 1967  J. M. B. DEDIEU  3,308,700
CUTTING APPARATUS WITH PENDULUM LIKE MOVEMENT
Filed April 26, 1965  3 Sheets-Sheet 1

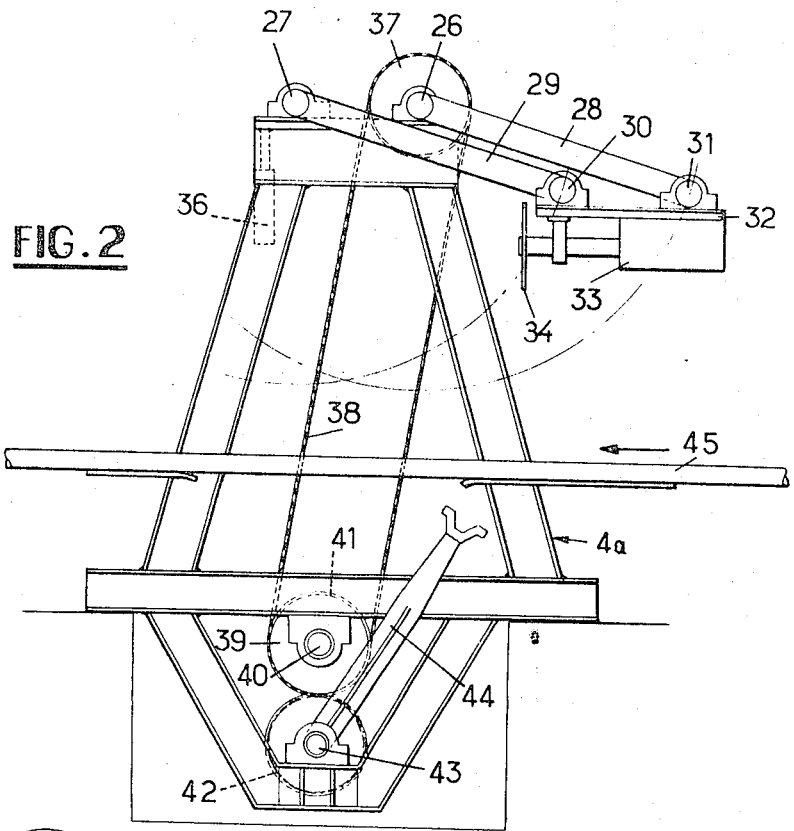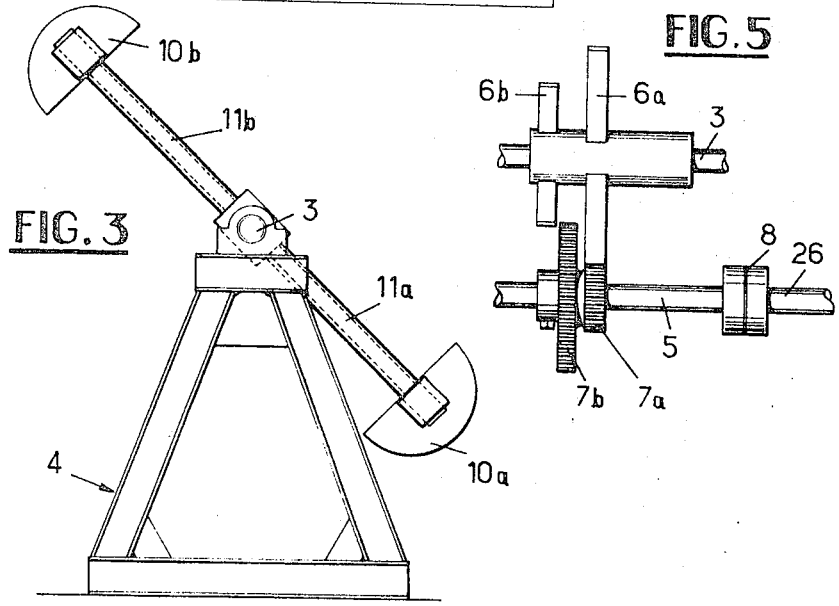

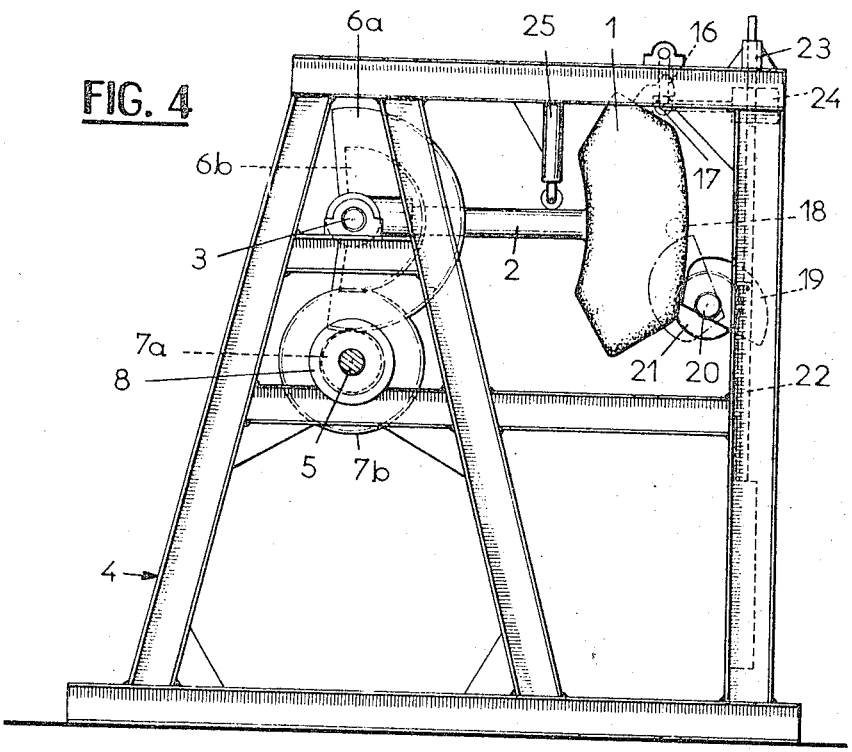
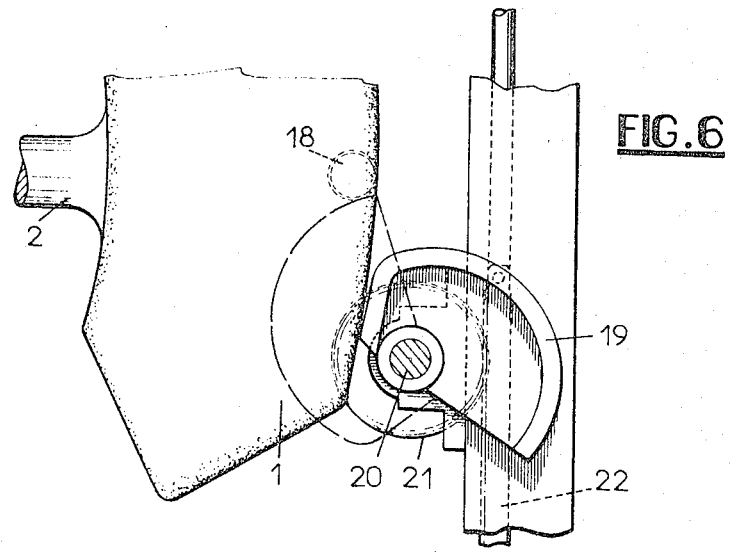

United States Patent Office 3,308,700
Patented Mar. 14, 1967

3,308,700
CUTTING APPARATUS WITH PENDULUM
LIKE MOVEMENT
Jacques Marcel Bernard Dedieu, Aulnoye-Aymeries, France, assignor to Societe Anonyme dite: Vallourec, Paris, France
Filed Apr. 26, 1965, Ser. No. 450,737
Claims priority, application France, Apr. 28, 1964, 972,703, Patent 1,402,070
7 Claims. (Cl. 83—311)

It is well known, particularly in the metallurgic industry, that it is often required to effect on continuously produced products a cutting operation at the exit of the machine producing said products. With the commonly used devices, a cutting apparatus accompanies the product to be cut-off at the same linear speed during the time required for its cutting-off, then returns to its initial position, said cutting apparatus having a reciprocating linear motion or a continuous or semi-continuous rotary motion.

Experiments have shown that with a cutting device having a reciprocating linear motion, it is usually most difficult to cut-off with precision a product issued at high speed out of a machine, in view of the large accelerations to which the cutting member has to be submitted for passing from shut down to the speed of the products to be cut-off.

It is moreover well known that, with a cutting member having a continuous rotary motion it is possible to obtain precise cuts of fixed length by synchronizing the peripheral speed of motion with the linear speed of the product to be cut-off, but that on the first hand, the cuts are not perpendicular to the longitudinal axis of the product and that, on the other hand, it is most difficult to obtain precise cuts at a predetermined location of the product to be cut-off. The latter problem is most troublesome in the art of continuously producing metal tubing, owing to the importance of the waste ends which are cut-off at the ends of a tube issuing from the rolling mill. For avoiding the leading end waste of a continuous rolled tube, it should be necessary, in the case of a cutting device having a continuous rotary motion, to synchronize the time of entry of the blank into the rolling mill as a function of the position of the cutting member and of the percentage of elongation of the rolled tube. Experiments have proved that said synchronizing is most difficult to obtain in practice and that the complexity thereof does not render said solution advantageous.

It is also well known that, for a cutting member with a non continuous rotary motion, it should be provided for a most complex regulation system of the motion, to obtain the tripping of the cutting member at a precise time, for obtaining a cutting of the tube with sufficient precision. The complex nature of the regulating system makes also this solution unpractical, as one never obtains the same precision as that which is obtainable with uniform circular motion cutting members.

The present invention has for its object to obviate said difficulties and to obtain cuts as precise as those obtained with cutting devices with a uniform rotary motion, while making possible to actuate the cutting operation at any time without utilization of a complex and delicate regulating or synchronization system.

The present invention has for its object a novel cutting device, having a pendular like motion, essentially characterized by the fact that the inertia of the pendular device supporting the cutting member is regulated so that the speed of the pendular device at the low point of its course, be substantially the same as that of the product to be cut-off, the motion of said product being substantially tangential to the path of the cutting member at the low point of said path.

The inventive device may also present the following characteristics, taken alone or in combination:
(1) The cutting member is a circular saw.
(2) The pendular-like device upon which is affixed the cutting member is an articulated parallelogram.
(3) The cutting member has its motion angularly offset relatively with the center of gravity of the pendulum, so that the cutting operation of the product to be cut-off begins only when the center of gravity of the pendulum has gone past the low point of its path.
(4) A latching device makes possible to retain the pendular device at the end of its stroke, that is after a movement corresponding to a period of the pendulum, and to release said device at the required time for a new cycle of cutting.
(5) The moment of inertia of the pendular device can be adjusted.
(6) A device which is actuated by the motion of the pendulum supports the products to be cut-off during the time the cut is being effected.
(7) The cutting member which is carried by the pendulum like device effects the cut only during the first half-period of its motion, collapsible means being provided to offset the path relatively with the product to be cut-off during the second half-period.

To give a better understanding of the invention, there will now be described a purely illustrative embodiment thereof taken in connection with the annexed drawings, on which:

FIG. 2 is an elevation of the cutting device of FIG. 1 taken by II—II of FIG. 1.

FIG. 3 is a detailed view of the system making possible to vary the inertia of the carriage having a pendular motion taken by III—III of FIG. 1.

FIG. 4 represents the construction of the device generating the pendular motion of the carriage, taken by IV—IV of FIG. 1.

FIG. 5 represents the back gear through which is transmitted the motion of the pendulum, shown on FIG. 4, to the carriage supporting the cutting member.

FIG. 6 is a detailed view of the latching member which retains the pendulum represented on FIG. 4 at the end of its stroke, that is after a movement corresponding to one period.

Figure 1:
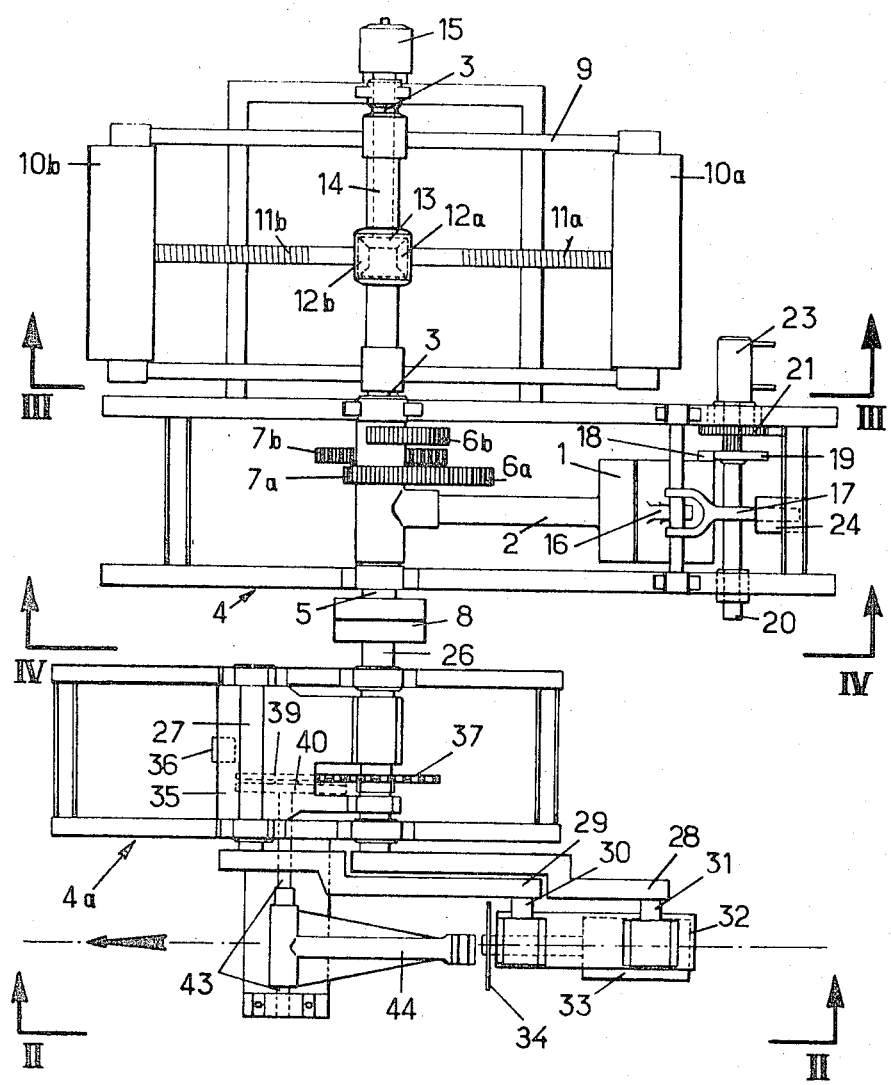
FIG. 1 is a plane view of a pendular motion cutting device according to the present invention.

Referring now to the drawings, it will be seen that the mass whose motion creates the pendulum-like movement of the invention device has been referenced 1. Said mass 1 may be rotatably moved about shaft 3, to which it is connected by arm 2. Shaft 3 is supported by a metal frame generally referenced 4, the elevation of said frame being substantially trapezoidal for a better stability of the machine wherein heavy masses are subject to relatively fast reciprocating motions.

The pendular motion of mass 1 is transmitted through a shaft 5 by means of a gearing having two toothed quadrants 6a and 6b rigidly connected with arm 2, and two gears 7a and 7b meshing with toothed quadrants 6a and 6b. Gears 7a and 7b are driving shaft 5 and communicate to any part rigidly connected to said shaft a pendulum-like motion resulting from the motion of mass 1 around shaft 3.

On shaft 3 is affixed a sleeve rigidly connected to a rectangular frame 9 whose long sides are slides, the short sides being masses 10a and 10b which may be spaced from shaft 3. Masses 10a and 10b are slidably mounted on the slides of frame 9, their spacing apart being effected through worms 11a and 11b, satellites 12a and 12b, planet gear 13 meshing with satellites 12a and 12b, sleeve 14 coaxial with shaft 3 and motor 15 mounted at the end of the shaft, said motor driving sleeve 14.

The above described arrangement makes possible to regulate the moment of inertia of the pendulum comprising mass 1, because masses 10a and 10b are mechanically linked to the motion of mass 1, and because said masses may be more or less spaced from shaft 3.

Mass 1 comprises a detent 16 which may be latched on a yoke 17 connected to frame 4. Mass 1 carries also a stop 18 upon which may bear a circular sector 19, movable about shaft 20 which is offset in relation with the center of sector 19. A gear wheel 21 is also movable about shaft 20. Said gear wheel is rigidly connected with sector 19 and meshes with a rack 22, placed vertically along an upright of frame 4. Said rack is actuated by a hydraulic ram 23 and, through gear wheel 21, moves sector 19. Sector 19 is arranged so that it may come into contact with stop 18 so as to slightly raise mass 1. Said slight raise makes possible the latching of detent 16 on yoke 17. Yoke 17 is connected to the frame but is not fixed relatively to said frame; it may be moved so that detent 16 is unlocked, thus releasing mass 1. Said movement is effected through electromagnet 24. Finally, for avoiding blows in the latching of detent 16 on yoke 17, a shock-absorber means 25, connected to the frame, bears on arm 2 when the mass 1 is at the locking position thereof at the high point of its path.

Sleeve 8 makes possible the coupling of shaft 5 through which the pendular like motion of mass 1 is transmitted to shaft 26. Shaft 26 is trunnioned at the top part of a frame 4a, whose shape is trapezoidal like frame 4, for increasing the stability of the machine with large masses with reciprocal motion. Frame 4a is also supporting at its top part another shaft 24, parallel to shaft 26. Two arms 28 and 29, of similar length, are pivoted on shafts 26 and 27, said arms bearing, at their bottom end, two shafts 30 and 31. Both shafts 30 and 31 are connected to the same platform 32 supporting a motor 33 driving a rotary saw 34. Platform 32, both arms 28 and 29 and the top part of frame 4a constitute a quadrangle which may be deformed around pivots 26, 27, 30 and 31. Said quadrangle is a parallelogram, and, thus, platform 32 remains always parallel with the top part of frame 4a, and is always kept horizontal.

At the top part of frame 4a is a platform 35 upon which is affixed shaft 27. Said platform 35 may be translated vertically by means of a hydraulic ram 36. The raising of platform 35 raises shaft 30 and saw 34.

On shaft 26 is keyed a toothed wheel 37 around which passes a chain 38. Wheel 37 drives, through chain 38 a toothed wheel 39 keyed on shaft 40 trunnioned at the bottom part of frame 4a. A supporting arm 44 is keyed on shaft 43. Arm 44 comes to support the article to be cut-off when saw 34 starts the cut. So, the length of said arm 44 is equal to the distance between shaft 43 and the product 45 to be cut-off.

When it is desired to initiate a cycle of cutting off, the electromagnet is energized for attracting yoke 17, thus releasing detent 16. As mass 1 is no more retained, it begins to rotate about shaft 3. Said movement drives sectors 6a and 6b and wheels 7a–7b who mesh with said sectors.

It should be noted that the gearing formed by sectors 6a and 6b and by gears 7a–7b is arranged in such a manner that only one sector and the corresponding gear 7a–7b are simultaneously meshed. On FIG. 5 is shown that sector 6a and gear 7a are meshed while sector 6b and gear 7b are offset one relatively to the other. The pendular motion of mass 1 is transmitted to shaft 5 and, through sleeve 8, to shaft 26.

The deformable parallelogram constituted by arms 28, 29, the upper part of frame 4a and platform 32 is deformed during the movement produced by the rotation of shaft 26, platform 32 remaining horizontal. The axis of saw 34 and motor 33 remains thus horizontal, the saw and motor having a pendular motion bringing same towards the low point of their motion. Through chain wheels 37 and 39, chain 39 and gears 41 and 42, arm 44 starts from its low position and ascends toward its upper position while rotating around shaft 43 with a pendular motion also.

When mass 1 passes at the low point of its path, platform 32 which is slightly offset, for instance relatively to mass 1, has not yet reached the low point of its path. The machine is adjusted so that the saw 34 begins to cut tube 45, at the time whereat mass 1 passes at the low point of the path thereof. The cutting of product 45 must be finished when the edge of the saw reaches the low point of its path.

The result of this position is that, during the cutting operation, pendular mass 1 is on its climbing cycle and that, in consequence, the speed of carriage 32 along its path decreases since the time whereat the cutting operation has begun. Then, the horizontal component of the speed of the cutting edge of the saw on its path differs from said speed to the extent that it is further from the low point of the path of the cutting edge. Therefore, the horizontal component of the cutting edge speed of saw 34 is submitted to two influences between the time at which the cutting begins and that at which it is finished: on the first hand, an increase due to the fact that the horizontal component progressively becomes equal to the speed itself when approaching the low point of the path of the saw cutting edge; on the second hand, a decrease due to the fact that the speed of the saw cutting edge on its path decreases in view of the ascension of mass 1. As both said influences are in opposite direction, one may obtain a horizontal component of the speed of the saw cutting edge which is substantially constant. The moment of inertia of the pendulum like device is adjusted so that the speed at which the saw passes at the low point of its path be equal to the uniform speed at which the product 45 passes under saw 34.

To effect said adjustment one has, on the first hand the masses 10a and 10b whose spacing relatively to shaft 3 allows a modification of the moment of inertia of mass 1 and, on the other hand, the gearing constituted by the toothed sections 6a and 6b and gears 7a, 7b. If, by means of motor 15, sleeve 14, gears 12a, 12b, 13 and worms 11a, 11b, masses 10a and 10b are further spaced from shaft 3, one obtains an increase of the moment of inertia of the pendulum formed by mass 1, and in consequence the period of the pendulum like device is increased and the maximum speed of the cutting edge of saw 34 is decreased. Moreover, it is possible, by means of gearing 6a, 6b, 7a, 7b to obtain a multiplication factor acting on speed of masses 10a and 10b or, otherwise stated, on the total moment of inertia brought back by calculation to the axis of the pendulum. One so obtains two successive ranges of values of the moment of inertia of the pendular assembly, which is sufficient to adapt the speed of the saw to the range of the industrial speed of the products.

When saw 34 has finished the cutting off of product 45, said product, as it continues to be issued by the production device, and being issued always at the same speed, will apply a horizontal thrust on saw 34 which, because of the ascension of mass 1, is progressively slowing down; said thrust is absorbed by a spring mounting of the saw which may be displaced parallel to its axis of rotation in the direction of the thrust and is then returned in position by a spring. If no angular offset had been provided between the mass and the platform supporting saw 34, it should have been necessary to obtain an equal value of the horizontal speed of the saw cutting edge and of the speed of the product at the low point of the path of the saw cutting edge, and it would have resulted a too large horizontal acceleration of said cutting edge in the course of the cutting operation, thus producing a skew cut.

The cutting being effected, platform 32, motor 33 and saw 34 are moved up to the high point of their path and effect a return path corresponding to the second period of their motion. At this time, an electric contact sends a signal to hydraulic ram 36, and the top part of frame 4a is raised up so that saw 34 may effect its back motion while keeping clear of the product 45.

When mass 1 is nearing the proximity of its upper or latching position, at the end of its return motion, an electric contact actuates hydraulic ram 23 which moves rack 22 and rotates sector 19 through gear 21. The rotation of sector 19 brings the top part thereof in engagement with stop 18 of mass 1 which is, at that time, close to its locking position. Through the action of ram 23, sector 19 gives a slight upward impulse to stop 18 and to mass 1, said impulse being intended to facilitate the latching of detent 16 on yoke 17. For avoiding a too violent action of said impulse, shock absorber 25 has been provided, said shock absorber bearing on arm 2. The latching being effected, one may initiate a new cutting-off cycle by energizing electro-magnet 24.

It is easy to understand that, with the abovedescribed device, a cutting operation may be initiated at any time, just by sending an impulsion to magnet 24. On the other hand, the use of a pendulum like device allows a very good consistency of the operations and thus to obtain lengths of product 45 of high precision.

It is to be understood that the abovedescribed embodiment is purely illustrative and not limitative and that those skilled in the art may bring to the invention all required modifications without going out of the scope of the invention. More particularly it is possible to control the motion of the saw by means of a hydraulic or electric multiplier piloted by a pendular system involving very light masses. Said process makes possible to avoid the use of heavy pendular masses, as it is the case for the abovedescribed system. Moreover, when the half period of the pendular motion during which is effected the cutting of product 45 is terminated, it is possible to clutch the pendulum like masses on a rotating shaft bringing back said masses to the point of departure thereof, after having effected a complete revolution. Said arrangement allows to reduce the time elapsed between two segmental cutting operations and to avoid the use of a retracting device of the saw for the return movement thereof, as said return movement is effected upwards.

What is claimed is:

1. A cutting device for elongate material being continuously advanced along a predetermined line, said device comprising a cutting member, suspension means carrying said cutting member and mounted to swing about an axis located eccentrically with respect to the center of mass of said suspension means and cutting member, said suspension means constraining said cutting member to swing in a path comprising a portion substantially coincident with said predetermined line and means for releasing said suspension means from a starting position in which said center of mass is out of vertical alignment with said axis, said suspension means being mounted to swing when so released primarily under the influence of inertia and gravity while moving said cutter member along said coincident path portion.

2. A cutting device as claimed in claim 1 comprising means for adjusting the position of said center of mass relative to said axis, and thereby regulating the speed of movement of said cutting means along its path.

3. Device as claimed in claim 1, in which the cutting member is a rotary saw which turns in a plane transverse to said predetermined line.

4. Device as claimed in claim 1, in which said suspension means comprises a parallelogram linkage which carries said cutting member.

5. Device as claimed in claim 1, in which the cutting member is angularly offset relative to a straight line connecting the center of gravity of the suspension means to said axis so that the cutting of the material being advanced begins only when the center of gravity of the suspension means has passed past the low point in its path of travel.

6. Device as claimed in claim 1, comprising an arm actuated by the motion of said suspension means, which arm supports the material to be cut during the cutting operation.

7. A device as claimed in claim 1, comprising means for lifting said cutting means away from the line along which said material is being advanced while said suspension means swings toward said starting position.

References Cited by the Examiner

UNITED STATES PATENTS

| | | | |
|---|---|---|---|
| 1,944,718 | 1/1934 | Rafter | 83—315 X |
| 2,693,630 | 11/1954 | Rodder | 83—327 X |
| 2,833,024 | 5/1958 | Boehm et al. | 83—327 X |
| 3,143,021 | 8/1964 | VomDorp | 83—329 |

WILLIAM W. DYER, JR., *Primary Examiner.*

J. M. MEISTER, *Examiner.*